(12) United States Patent
Pan

(10) Patent No.: US 8,564,166 B2
(45) Date of Patent: Oct. 22, 2013

(54) MOTOR STRUCTURE

(75) Inventor: Mingpan Pan, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 166 days.

(21) Appl. No.: 13/294,154

(22) Filed: Nov. 10, 2011

(65) Prior Publication Data

US 2013/0038165 A1 Feb. 14, 2013

(30) Foreign Application Priority Data

Aug. 11, 2011 (CN) .......................... 2011 1 0229712

(51) Int. Cl.
*H02K 21/12* (2006.01)

(52) U.S. Cl.
USPC .............................. 310/156.48; 310/216.018

(58) Field of Classification Search
USPC ................. 310/156.48, 216.001, 310/216.018–216.019, 216.025–216.031
See application file for complete search history.

(56) References Cited

U.S. PATENT DOCUMENTS

| | | | | |
|---|---|---|---|---|
| 5,010,266 A | * | 4/1991 | Uchida | 310/156.22 |
| 5,091,668 A | * | 2/1992 | Cuenot et al. | 310/156.61 |
| 5,157,297 A | * | 10/1992 | Uchida | 310/156.61 |
| 5,200,662 A | * | 4/1993 | Tagami et al. | 310/156.61 |
| 5,463,262 A | * | 10/1995 | Uchida | 310/156.61 |
| 5,886,441 A | * | 3/1999 | Uchida et al. | 310/156.57 |
| 5,939,810 A | * | 8/1999 | Uchida et al. | 310/156.57 |
| 6,441,528 B1 | * | 8/2002 | Uchida et al. | 310/216.001 |

* cited by examiner

*Primary Examiner* — Thanh Lam
(74) *Attorney, Agent, or Firm* — Matthias Scholl P.C.; Matthias Scholl

(57) ABSTRACT

A motor structure including a stator assembly having a stator core and a winding and a rotor assembly embedded therein having a rotor core and a permanent magnet. The stator core includes a yoke and a plurality of teeth protruding inwards from the yoke. Two adjacent teeth form a wire embedding slot and the winding is placed inside the wire embedding slot and winds around the teeth. The rotor core includes an annular ring having a central axial pore and a plurality of magnetic induction blocks protruding outwards from an outer side of the annular ring. Two adjacent magnetic induction blocks form a radial recess for mounting the permanent magnet. The section of an outer side surface of the magnetic induction blocks is a circular-arc line. The outer side surface employs a point with a distance deviating from the center of the central axial pore as a center of circle.

20 Claims, 9 Drawing Sheets

MOTOR STRUCTURE

CROSS-REFERENCE TO RELATED APPLICATIONS

Pursuant to 35 U.S.C. §119 and the Paris Convention Treaty, this application claims the benefit of Chinese Patent Application No. 201110229712.7 filed Aug. 11, 2011, the contents of which are incorporated herein by reference.

BACKGROUND OF THE INVENTION

1. Field of the Invention

The invention relates to a motor structure.

2. Description of the Related Art

As shown in FIG. 1 and FIG. 2, a conventional motor structure includes a stator assembly and a rotor assembly. The stator assembly includes a stator core 1 and a winding. The stator core 1 includes a yoke 10 and a plurality of teeth 11 protruding inwards from the yoke 10. Two adjacent teeth 11 form a wire embedding slot 12. The winding is placed inside the wire embedding slot 12 and winds around the teeth 11. The rotor assembly includes a rotor core 2 and a permanent magnet 3. The rotor core 2 includes an annular ring 21 having a central axial pore 20 and a plurality of magnetic induction blocks 22 protruding outwards from outside of the annular ring 21. Two adjacent magnetic induction blocks 22 form a radial recess 23, and the permanent magnet 3 is mounted inside the recess 23. As shown in FIG. 1, outer contours of both the magnetic induction blocks 22 and the teeth 11 are formed by an arc-shaped line. As shown in FIG. 2, outer contour of the magnetic induction blocks 22 is formed by an arc-shaped line while that of the teeth 11 is formed by a straight line. Such structure has the disadvantages of higher stator's cogging torque, larger magnetic leakage between the stator and rotor teeth, and distorted top waveform of counter-electromotive force, thereby affecting the motor's service performance.

SUMMARY OF THE INVENTION

In view of the above-described problems, it is one objective of the invention to provide a motor structure that has a simple structure, low magnetic leakage between the stator and rotor teeth, low cogging torque ripple, big counter-electromotive force constant, smooth waveform of counter-electromotive force, high service performance, and low loss.

To achieve the above objective, in accordance with one embodiment of the invention, there provided is a motor structure comprising a stator assembly and a rotor assembly embedded therein, wherein the stator assembly comprises a stator core and a winding; the stator core comprises a yoke and a plurality of teeth protruding inwards from the yoke; two adjacent teeth form a wire embedding slot; the winding is placed inside the wire embedding slot and winds around the teeth; the rotor assembly comprises a rotor core and a permanent magnet; the rotor core comprises an annular ring having a central axial pore and a plurality of magnetic induction blocks protruding outwards from an outer side of the annular ring; two adjacent magnetic induction blocks form a radial recess for mounting the permanent magnet; the magnetic induction blocks at both sides of an opening of the radial recess protrude with a hook block; the section of an outer side surface of the magnetic induction blocks is a circular-arc line; and the outer side surface employs a point with a distance deviating from the center of the central axial pore as a center of circle thereof.

In a class of this embodiment, an inner side surface of the teeth comprises an incurvate outer arc line in the middle and an outer cutting edge at both sides; the outer side surface of the magnetic induction blocks cooperates with the inner side surface of the teeth and the outer arc line is a circular-arc line.

In a class of this embodiment, the distance deviating from the center of the central axial pore is 5-20 mm.

In a class of this embodiment, the maximum external diameter of the rotor core is 80-90 mm, the external diameter of the stator core is 135-145 mm, the diameter of the inner circular hole of the stator core is 82-92 mm and bigger than the maximum external diameter of the rotor core.

In a class of this embodiment, an outer side edge of the stator core is configured with a plurality of cut lines, and a mounting hole is arranged on the stator core and close to the cut lines.

In a class of this embodiment, the number of the teeth is 12 and the number of the magnetic induction blocks and the permanent magnets are 10.

In a class of this embodiment, a distance between two hook blocks arranged at the opening of the same radial recess is 3.5-5 mm.

In a class of this embodiment, a convex plate is arranged at the middle bottom of the radial recess.

In a class of this embodiment, each magnetic induction block is arranged with a through hole in the middle, and a line connecting the center of the central axial pore and the center of circle is a central boundary line of the circular-arc line of the outer side surface of each magnetic induction block.

Advantages of the invention are summarized below:

1) the rotor core comprises the annular ring having the central axial pore and a plurality of magnetic induction blocks protruding outwards from the outer side of the annular ring, two adjacent magnetic induction blocks form the radial recess for mounting the permanent magnet, the magnetic induction blocks at both sides of the opening of the radial recess protrude with a hook block, the section of the outer side surface of the magnetic induction blocks is a circular-arc line and the outer side surface employs a point with a distance deviating from the center of the central axial pore as the center of circle. Such structure is helpful to reduce magnetic leakage of the rotor core, lower cogging torque ripple, and achieve big counter-electromotive force constant and smooth waveform of the counter-electromotive force. Therefore, the motor's performance has been improved and losses have been reduced;

2) the inner side surface of the teeth comprises the incurvate outer arc line in the middle and the outer cutting edge at both sides, the outer side surface of the magnetic induction blocks cooperates with the inner side surface of the teeth and the outer arc line is a circular-arc line. Such construction helps to further reduce magnetic leakage and lower the cogging torque ripple;

3) the distance deviating from the center of the central axial pore is 5-20 mm, the maximum external diameter of the rotor core is 80-90 mm, external diameter of the stator core is 135-145 mm, diameter of the inner circular hole of the stator core is 82-92 mm and bigger than the maximum external diameter of the rotor core; the outer side edge of the stator core is configured with a plurality of cut lines, and the mounting hole is arranged on the stator core and close to the cut lines; the number of the teeth is 12 and the number of the magnetic induction blocks and the permanent magnets are 10. The performance of the stator core and the rotor core can be optimized under the consistent performance. Moreover, materials are saved and thus product costs reduced; and 4) the distance between the two hook blocks arranged at the opening of the same radial recess is 3.5-5 mm and a convex plate is arranged at the middle bottom of the radial recess, thus it can further reduce the magnetic leakage and lower the cogging torque ripple.

DETAILED DESCRIPTION OF THE EMBODIMENTS

Figure 1:
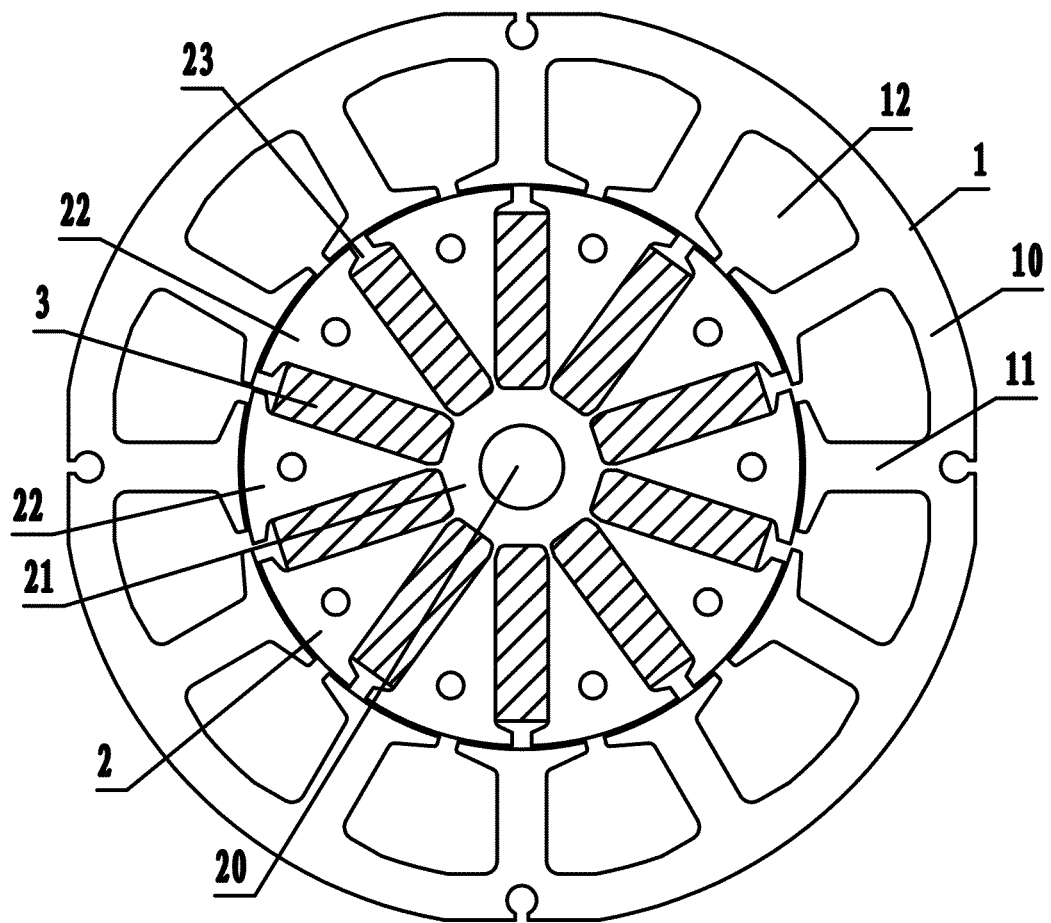
FIG. 1 is a schematic diagram of a motor structure in the prior art.

The invention is explained in further detail below with reference to the accompanying drawings and embodiments.

As shown in FIGS. 3-8, a motor structure provided by the invention comprises a stator assembly and a rotor assembly embedded therein. The stator assembly comprises a stator core 1 and a winding. The stator core 1 comprises a yoke 10 and a plurality of teeth 11 protruding inwards from the yoke 10. Two adjacent teeth 11 form a wire embedding slot 12. The winding is placed inside the wire embedding slot 12 and winds around the teeth 11. The rotor assembly comprises a rotor core 2 and a permanent magnet 3. The rotor core 2 comprises an annular ring 22 having a central axial pore 21 and a plurality of magnetic induction blocks 23 protruding outwards from an outer side of the annular ring 22. Two adjacent magnetic induction blocks 23 form a radial recess 24 for mounting the permanent magnet 3. The magnetic induction blocks 23 at both sides of the opening 25 of the radial recess 24 protrude with a hook block 26. The section of an outer side surface 231 of the magnetic induction blocks 23 is a circular-arc line and the outer side surface 231 employs a point A with a distance H deviating from the center O of the central axial pore 21 as the center of circle. An inner side surface of the teeth 11 comprises an incurvate outer arc line 110 in the middle and an outer cutting edge 111 at both sides. The outer side surface 231 of the magnetic induction blocks 23 cooperates with the inner side surface of the teeth 11 and the outer arc line 110 is a circular-arc line. The distance H deviating from the center O of the central axial pore 21 is 5-20 mm. The maximum external diameter D1 of the rotor core 2 is 80-90 mm. The external diameter D2 of the stator core 1 is 135-145 mm. The diameter D3 of the inner circular hole of the stator core is 82-92 mm and D3 is bigger than D1. An outer side edge of the stator core 1 is configured with a plurality of cut lines 13, and a mounting hole 14 is arranged on the stator core 1 and close to the cut lines 13. The number of the teeth 11 is 12 and the number of the magnetic induction blocks 23 and the permanent magnets 3 are 10. The distance L between the two hook blocks 26 arranged at the opening 25 of the same radial recess 24 is 3.5-5 mm. A convex plate 242 is arranged at the middle bottom of the radial recess 24. Each magnetic induction block 23 is arranged with a through hole 232 in the middle, and a line connecting the center O of the central axial pore 21 and the center of circle A is the central boundary line of the circular-arc line of the outer side surface 231.

The rotor core 2 of the invention comprises the annular ring 22 having the central axial pore 21 and a plurality of magnetic induction blocks 23 protruding outwards from outer side of the annular ring 22. Two adjacent magnetic induction blocks 23 form the radial recess 24 for mounting the permanent magnet 3. The magnetic induction blocks 23 at both sides of the opening 25 of the radial recess 24 protrude with the hook block 26. The section of the outer side surface 231 of the magnetic induction blocks 23 is a circular-arc line and the outer side surface 231 employs a point A with a distance H deviating from the center O of the central axial pore 21 as the center of circle. The inner side surface of the teeth 11 of the stator core 1 comprises the incurvate outer arc line 110 in the middle and the outer cutting edge 111 at two sides. The outer side surface 231 of the magnetic induction blocks 23 cooperates with the inner side surface of the teeth 11 and the outer arc line 110 is a circular-arc line. Such structure has the advantages of lowering magnetic leakage between the stator core and rotor core, lowering cogging torque ripple, achieving a big counter-electromotive force constant and smooth waveform of counter-electromotive force (EMF). Thus, the motor's performance has been improved and losses reduced.

Figure 2:
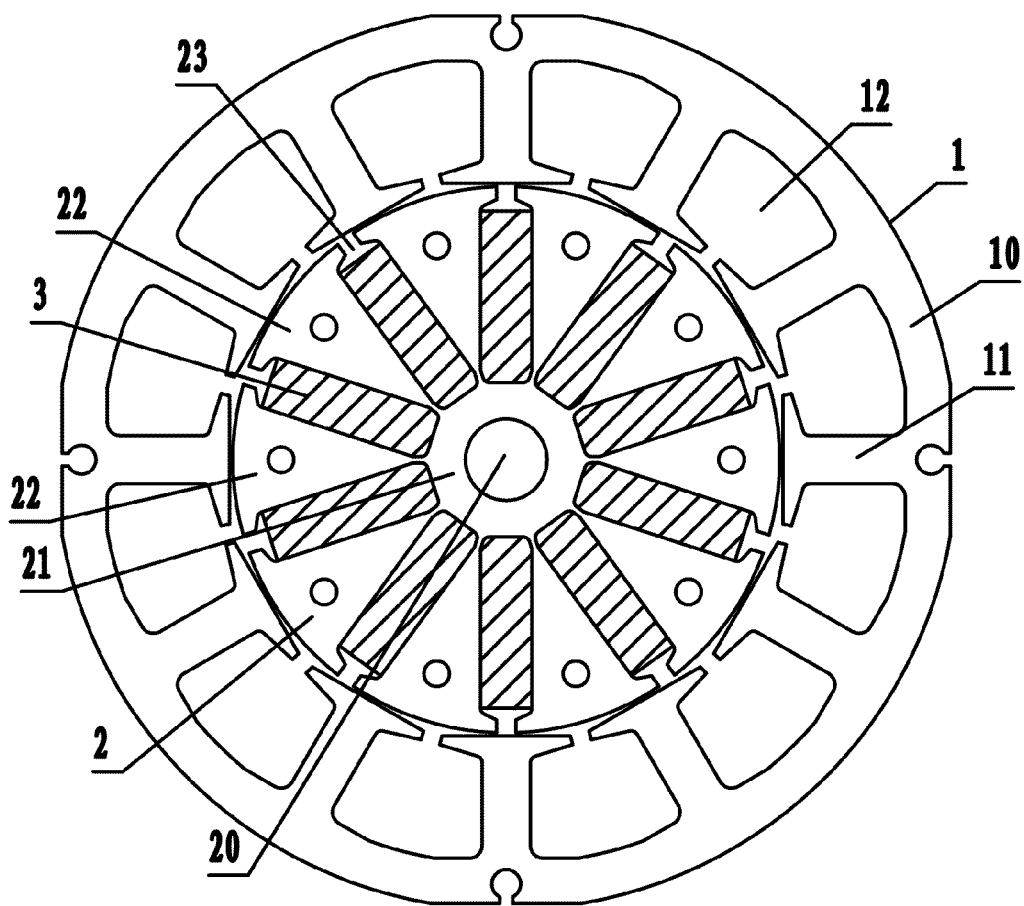
FIG. 2 is another schematic diagram of a motor structure in the prior art.
Figure 3:
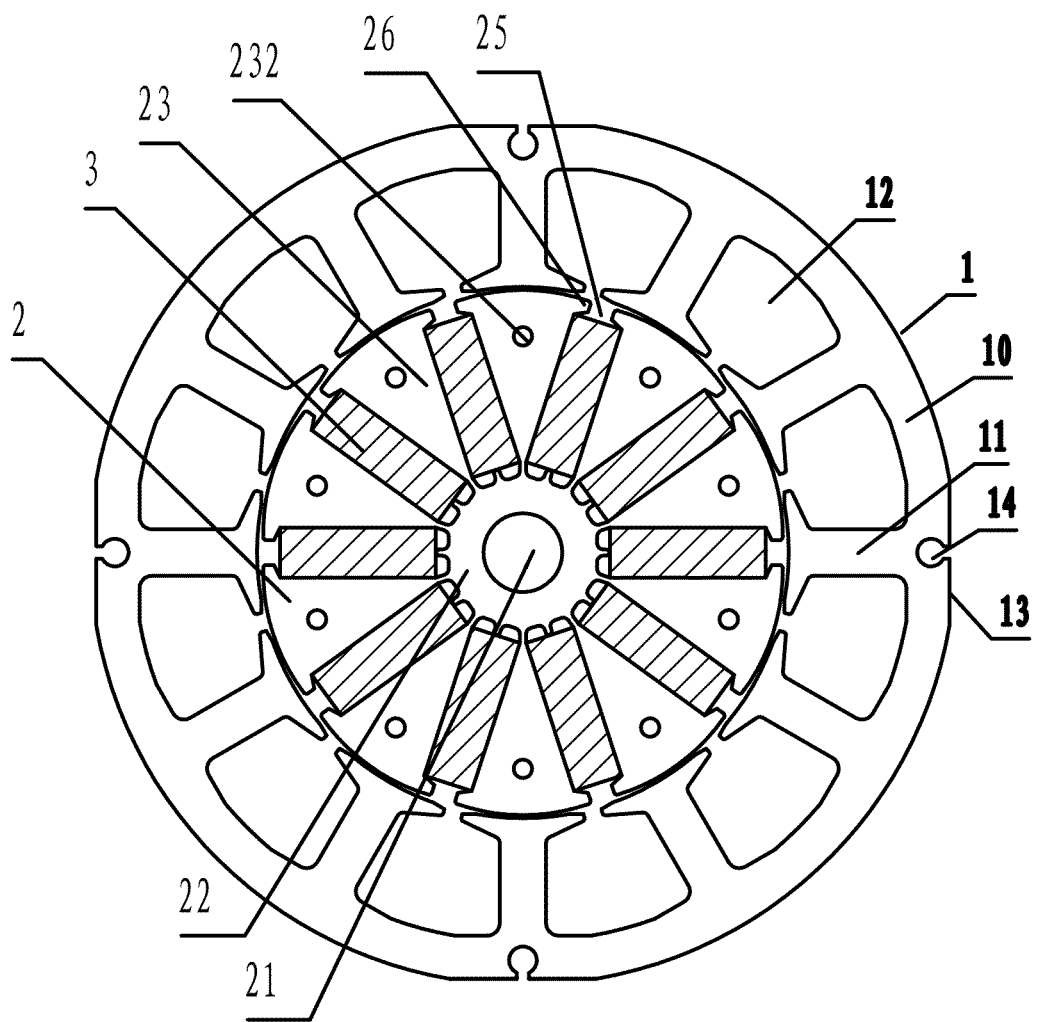
FIG. 3 is a schematic diagram of a motor structure according to one embodiment of the invention.
Figure 4:
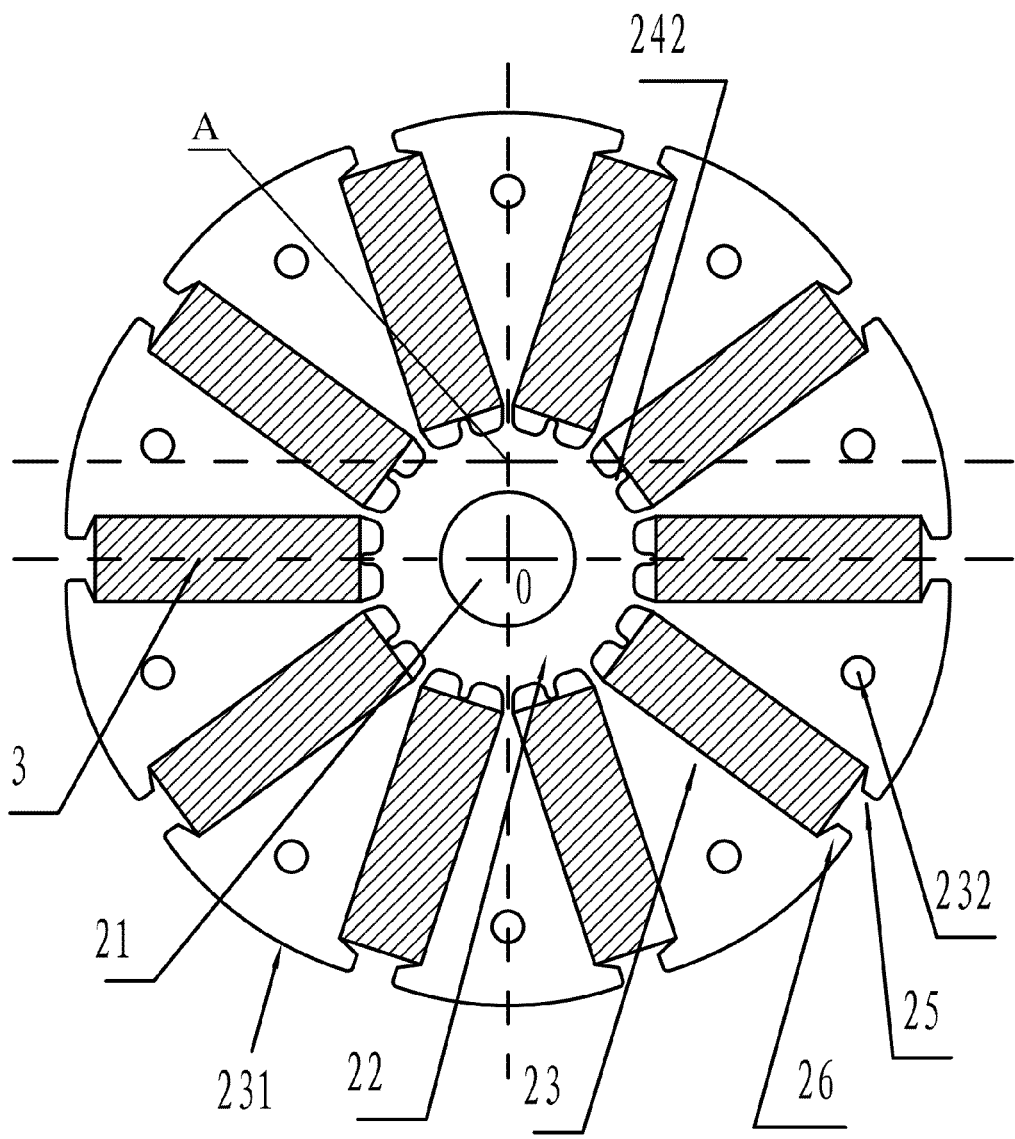
FIG. 4 is a schematic diagram of a rotor according to one embodiment of the invention.
Figure 5:
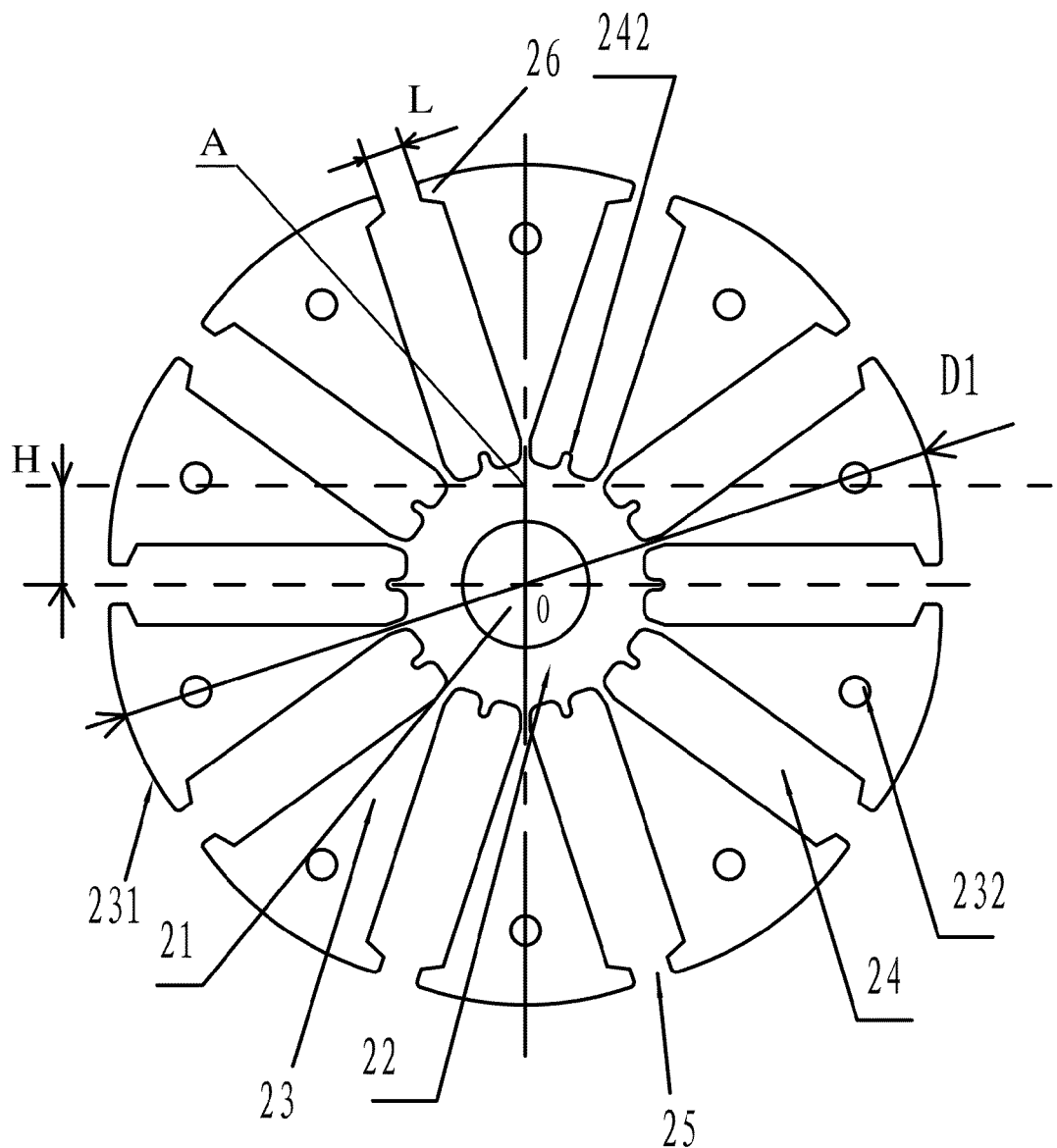
FIG. 5 is a schematic diagram of a rotor core according to one embodiment of the invention.
Figure 6:
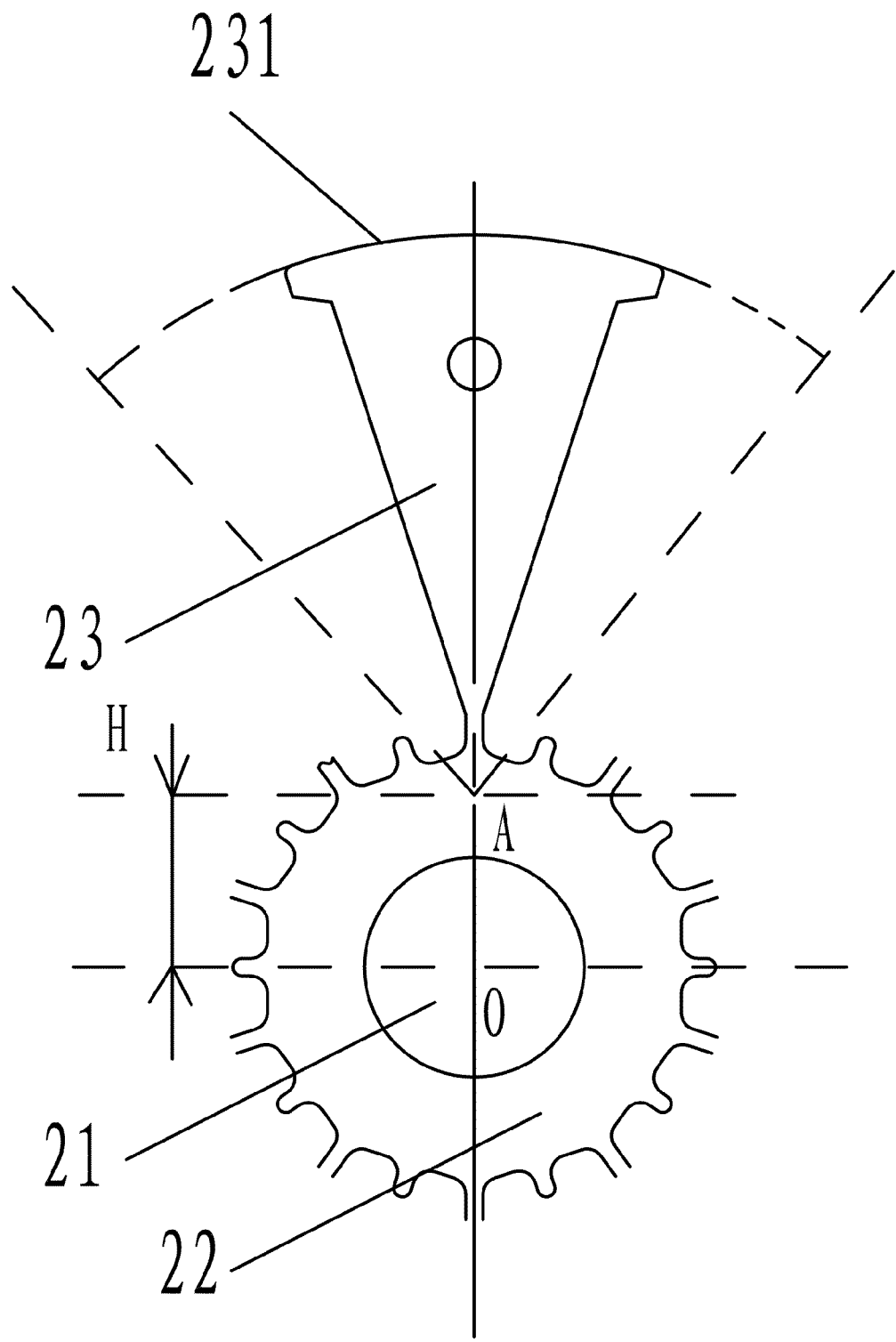
FIG. 6 is a partially enlarged view of a rotor core according to one embodiment of the invention.
Figure 7:
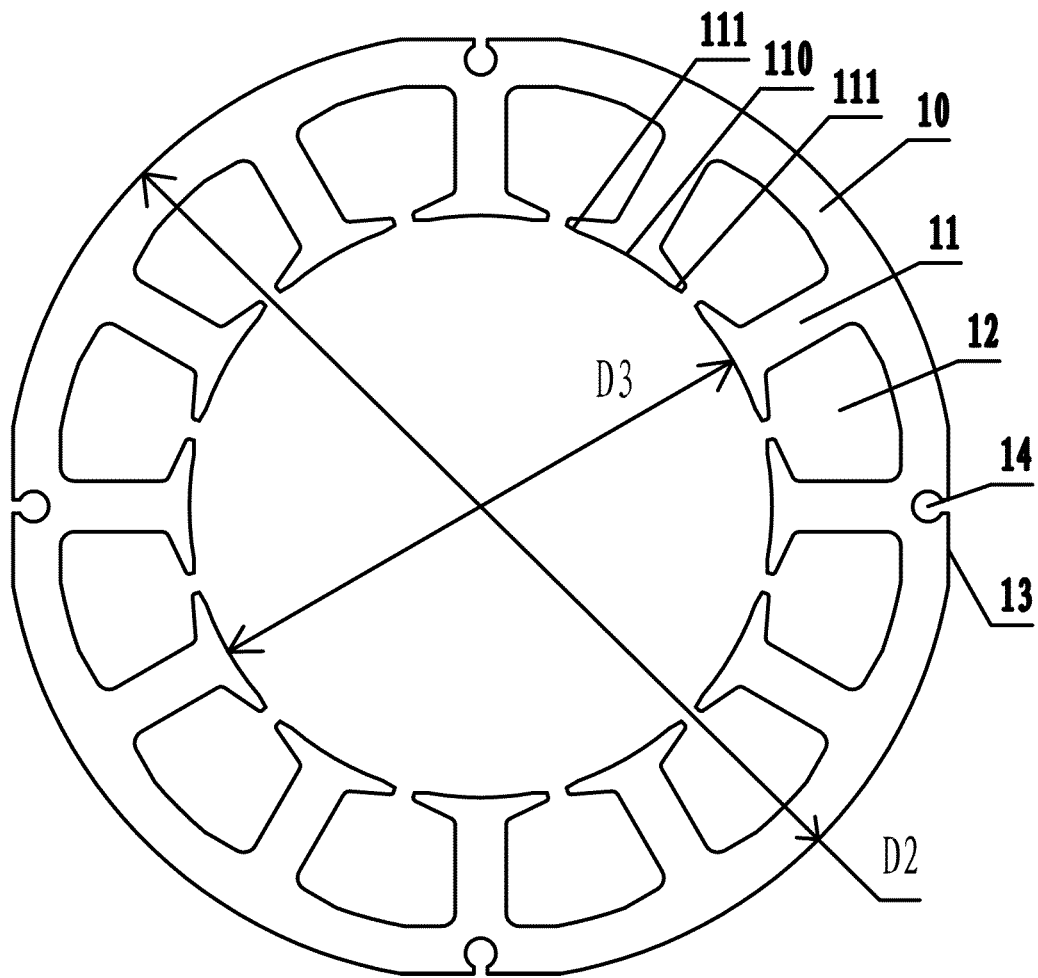
FIG. 7 is a schematic diagram of a stator core according to one embodiment of the invention.
Figure 8:
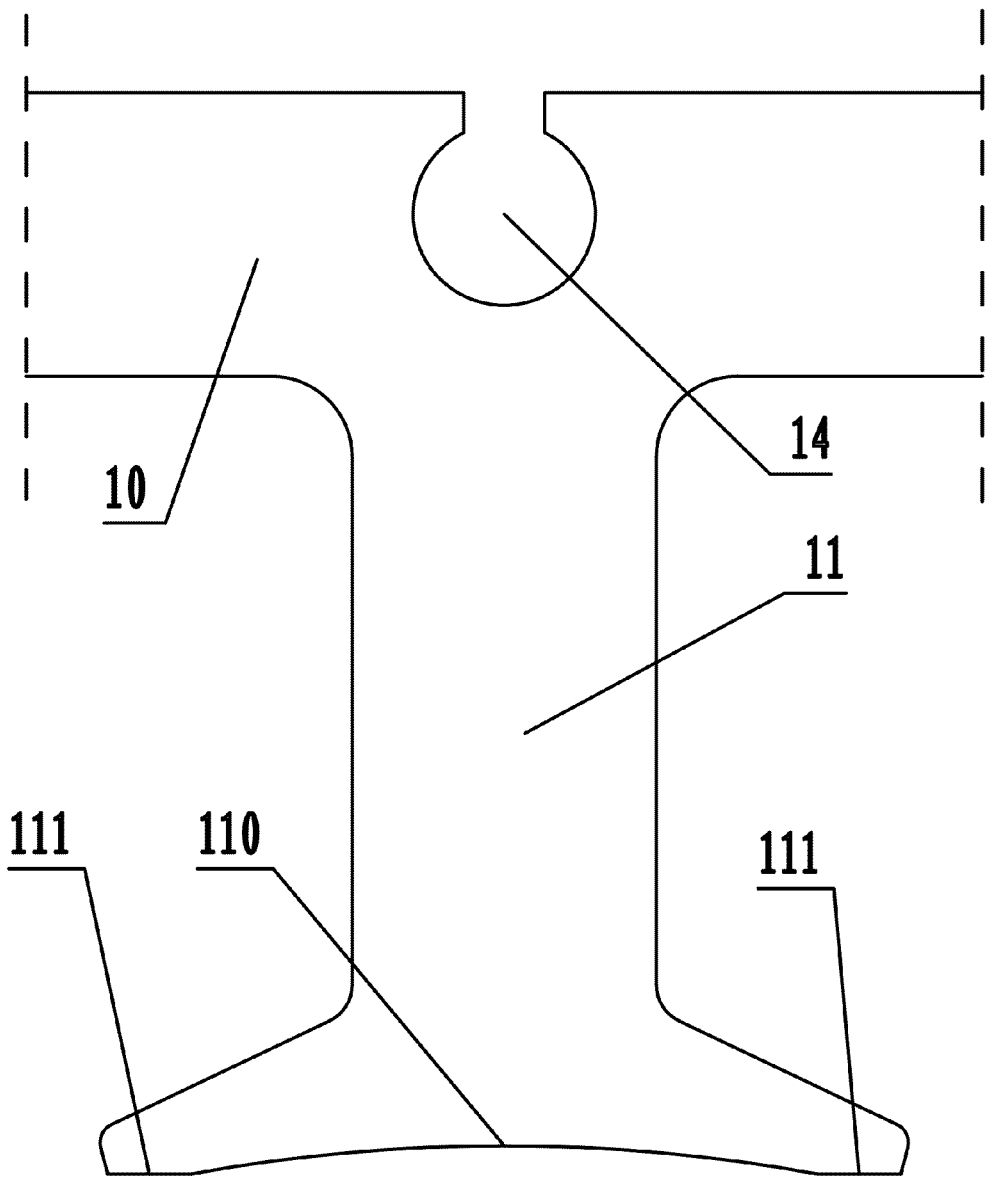
FIG. 8 is a partially enlarged view of a stator core according to one embodiment of the invention.
Figure 9:
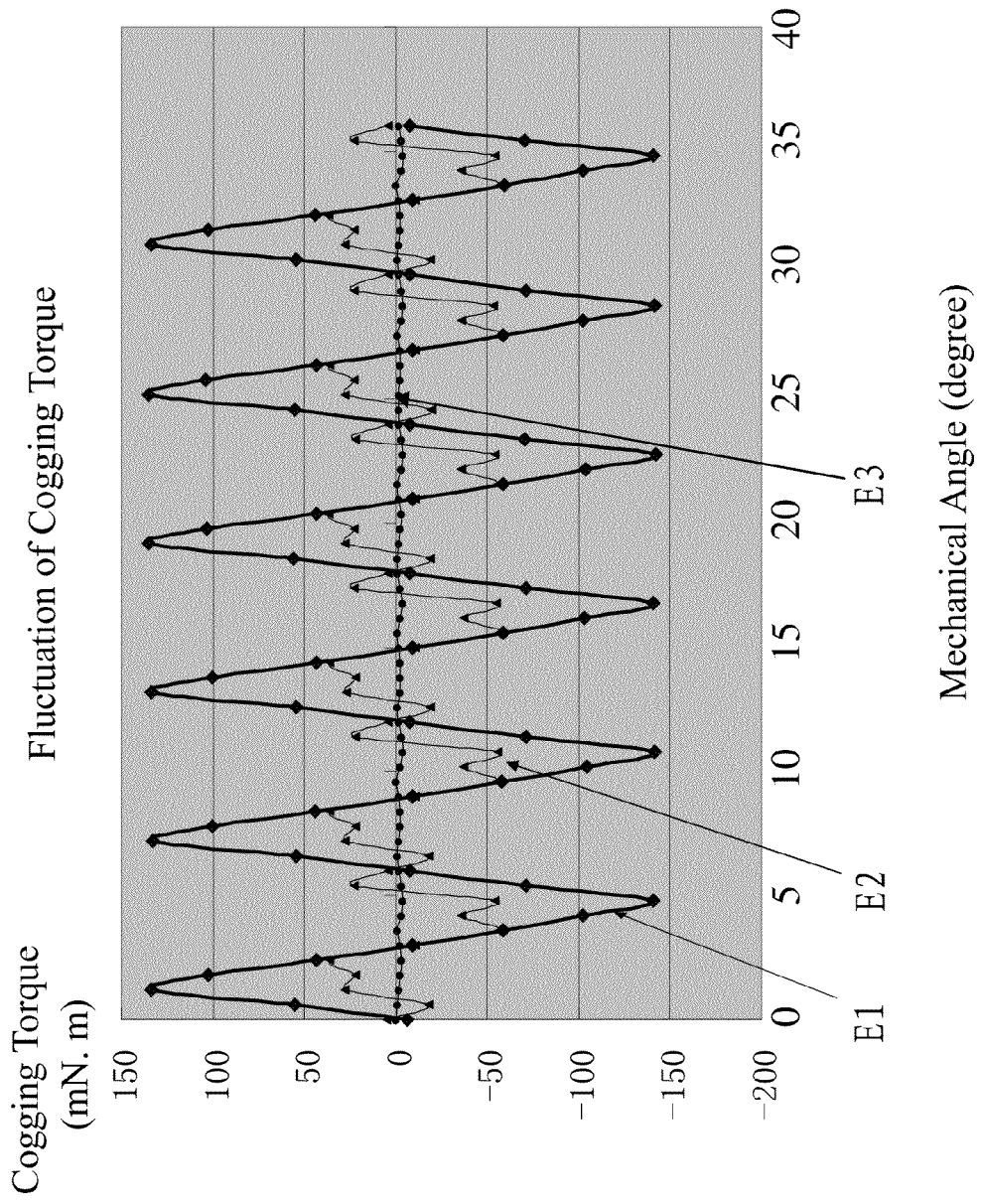
FIG. 9 is a cogging torque waveform diagram of three solutions.

As shown in FIG. 9, E1, E2 and E3 are cogging torque waveform diagrams corresponding to the technical solutions of FIG. 1, FIG. 2, and FIG. 3, respectively. It is evident that the motor's cogging torque applied by the technical solutions of the invention has very small fluctuation; hence it is extremely helpful to improve the motor's performance. The three technical solutions are shown in Table 1.

TABLE 1

|  | Solution 1 (FIG. 1) | Solution 2 (FIG. 2) | Invention (FIG. 3) |
|---|---|---|---|
| Amplitude of cogging torque ripple (mN · m) | 140 | 40 | 4 |
| Amplitude of counter EMF (V) | 100 | 90 | 110 |

The invention claimed is:

1. A motor structure, comprising a stator assembly and a rotor assembly embedded therein, wherein the stator assembly comprises a stator core and a winding;

the stator core comprises a yoke and a plurality of teeth protruding inwards from the yoke;

two adjacent teeth form a wire embedding slot;

the winding is placed inside the wire embedding slot and winds around the teeth;

the rotor assembly comprises a rotor core and a permanent magnet;

the rotor core comprises an annular ring having a central axial pore and a plurality of magnetic induction blocks protruding outwards from an outer side of the annular ring;

two adjacent magnetic induction blocks form a radial recess for mounting the permanent magnet;

the magnetic induction blocks at both sides of an opening of the radial recess protrude with a hook block;

the section of an outer side surface of the magnetic induction blocks is a circular-arc line; and the outer side surface of the magnetic induction blocks employs a point with a distance deviating from a center of the central axial pore as a center of circle thereof.

2. The motor structure of claim 1, wherein an inner side surface of the teeth comprises an incurvate outer arc line in the middle and an outer cutting edge at both sides; and the outer side surface of the magnetic induction blocks cooperates with the inner side surface of the teeth.

3. The motor structure of claim 2, wherein the incurvate outer arc line is a circular-arc line.

4. The motor structure of claim 1, wherein the distance deviating from the center of the central axial pore is 5-20 mm.

5. The motor structure of claim 2, wherein the distance deviating from the center of the central axial pore is 5-20 mm.

6. The motor structure of claim 3, wherein the distance deviating from the center of the central axial pore is 5-20 mm.

7. The motor structure of claim 4, wherein the maximum external diameter of the rotor core is 80-90 mm; the external diameter of the stator core is 135-145 mm; and the diameter of the inner circular hole of the stator core is 82-92 mm and bigger than the maximum external diameter of the rotor core.

8. The motor structure of claim 5, wherein the maximum external diameter of the rotor core is 80-90 mm; the external diameter of the stator core is 135-145 mm; and the diameter of the inner circular hole of the stator core is 82-92 mm and bigger than the maximum external diameter of the rotor core.

9. The motor structure of claim 6, wherein the maximum external diameter of the rotor core is 80-90 mm; the external diameter of the stator core is 135-145 mm; and the diameter of the inner circular hole of the stator core is 82-92 mm and bigger than the maximum external diameter of the rotor core.

10. The motor structure of claim 1, wherein an outer side edge of the stator core is configured with a plurality of cut lines, and a mounting hole is arranged on the stator core and close to the cut lines.

11. The motor structure of claim 6, wherein an outer side edge of the stator core is configured with a plurality of cut lines, and a mounting hole is arranged on the stator core and close to the cut lines.

12. The motor structure of claim 7, wherein the number of the teeth is 12 and the number of the magnetic induction blocks and the permanent magnets are 10.

13. The motor structure of claim 8, wherein the number of the teeth is 12 and the number of the magnetic induction blocks and the permanent magnets are 10.

14. The motor structure of claim 9, wherein the number of the teeth is 12 and the number of the magnetic induction blocks and the permanent magnets are 10.

15. The motor structure of claim 4, wherein a distance between two hook blocks arranged at the opening of the same radial recess is 3.5-5 mm.

16. The motor structure of claim 6, wherein a distance between two hook blocks arranged at the opening of the same radial recess is 3.5-5 mm.

17. The motor structure of claim 4, wherein a convex plate is arranged at the middle bottom of the radial recess.

18. The motor structure of claim 6, wherein a convex plate is arranged at the middle bottom of the radial recess.

19. The motor structure of claim 4, wherein each magnetic induction block is arranged with a through hole in the middle, and a line connecting the center of the central axial pore and the center of circle is a central boundary line of the circular-arc line of the outer side surface of each magnetic induction block.

20. The motor structure of claim 6, wherein each magnetic induction block is arranged with a through hole in the middle, and a line connecting the center of the central axial pore and the center of circle is a central boundary line of the circular-arc line of the outer side surface of each magnetic induction block.

* * * * *